(12) United States Patent
Ryu et al.

(10) Patent No.: US 8,957,629 B2
(45) Date of Patent: Feb. 17, 2015

(54) BATTERY PACK WITH WIRELESS POWER TRANSMISSION RESONATOR

(75) Inventors: Young Ho Ryu, Yongin-si (KR); Eun Seok Park, Suwon-si (KR); Sang Wook Kwon, Seongnam-si (KR); Young Tack Hong, Seongnam-si (KR); Nam Yun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 831 days.

(21) Appl. No.: 12/967,159

(22) Filed: Dec. 14, 2010

(65) Prior Publication Data

US 2011/0140541 A1 Jun. 16, 2011

(30) Foreign Application Priority Data

Dec. 14, 2009 (KR) .......................... 10-2009-0124269

(51) Int. Cl.
*H02J 7/00* (2006.01)
*H01Q 9/00* (2006.01)
*H01Q 1/38* (2006.01)
*H02J 7/02* (2006.01)

(52) U.S. Cl.
CPC .............. *H02J 7/025* (2013.01); *H02J 7/0045* (2013.01)
USPC ...................... 320/108; 343/745; 343/700 MS

(58) Field of Classification Search
USPC .............................. 320/108; 343/745, 700 MS
See application file for complete search history.

(56) References Cited

U.S. PATENT DOCUMENTS

| 6,727,785 | B2 * | 4/2004 | Killen et al. ................... 333/219 |
| 6,933,812 | B2 * | 8/2005 | Sarabandi et al. ............ 333/219 |
| 6,938,325 | B2 * | 9/2005 | Tanielian ...................... 29/602.1 |
| 7,187,250 | B2 * | 3/2007 | Matters-Kammerer et al. ............................... 333/116 |
| 7,218,190 | B2 | 5/2007 | Engheta et al. |
| 7,221,327 | B2 * | 5/2007 | Toncich ......................... 343/860 |
| 7,307,596 | B1 * | 12/2007 | West .............................. 343/778 |
| 7,511,454 | B1 * | 3/2009 | Legg .............................. 320/108 |
| 7,864,114 | B2 * | 1/2011 | Sanada ................... 343/700 MS |
| 8,115,448 | B2 * | 2/2012 | John .............................. 320/108 |
| 8,174,341 | B2 * | 5/2012 | Lee et al. ....................... 333/219 |
| 8,232,764 | B2 * | 7/2012 | Inoue et al. ................... 320/108 |
| 2005/0162324 | A1 * | 7/2005 | Sato et al. ..................... 343/745 |
| 2009/0140946 | A1 | 6/2009 | Ziolkowski et al. |
| 2010/0148723 | A1 * | 6/2010 | Cook et al. .................... 320/108 |

(Continued)

FOREIGN PATENT DOCUMENTS

| KR | 10-0543779 | 1/2006 |
| KR | 10-0603986 | 7/2006 |

(Continued)

OTHER PUBLICATIONS

C.R. Simovski et al., "High Impedance Surfaces Based on Self-Resonant Grids. Analytical Modelling and Numerical Simulations", Progress in Electromagnetics Research, PIER 45, 2003, pp. 239-256.*

(Continued)

*Primary Examiner* — Richard V Muralidar
*Assistant Examiner* — Michael Dibenedetto
(74) *Attorney, Agent, or Firm* — NSIP Law

(57) ABSTRACT

A battery pack employing a resonator for wireless power transmission is provided. The battery pack may include a thin film type resonator for a wireless power transmission. The battery pack may also include a battery to charge a power source using power generated by the thin film type resonator.

20 Claims, 10 Drawing Sheets

(56) References Cited

U.S. PATENT DOCUMENTS

2010/0201314 A1* 8/2010 Toncich et al. ............... 320/108
2011/0057606 A1* 3/2011 Saunamaki .................. 320/108

FOREIGN PATENT DOCUMENTS

| KR | 10-0819753 | 3/2008 |
| KR | 10-2008-0053808 | 6/2008 |
| KR | 10-2009-0027312 | 3/2009 |
| KR | 10-2009-0113418 | 11/2009 |

OTHER PUBLICATIONS

C.R. Simovski et al., "High Impedance Surfaces Based on Self-Resonant Grids, Analytical Modelling and Numerical Simulations", Progress in Electromagnetics Research, PIER 45, 2003, pp. 239-256.*

Ignacio Gil et al., "Tunable Metamaterial Transmission Lines Based on Varactor-Loaded Split-Ring Resonators", IEEE Transactions on Microwave Theory and Techniques, vol. 54, No. 6, Jun. 2006, pp. 2665-2674.*

* cited by examiner 211
220

BATTERY PACK WITH WIRELESS POWER TRANSMISSION RESONATOR

CROSS-REFERENCE TO RELATED APPLICATION(S)

This application claims the benefit under 35 U.S.C. §119(a) of Korean Patent Application No. 10-2009-0124269, filed on Dec. 14, 2009, in the Korean Intellectual Property Office, the entire disclosure of which is incorporated herein by reference for all purposes.

BACKGROUND

1. Field

The following description relates to resonator for wireless power transmission and a battery pack including the resonator.

2. Description of Related Art

Recently, techniques for wireless power transmission have been attracting much attention. Particularly, techniques for supplying power wirelessly to various types of mobile devices such as a cell phone, a laptop computer, an MP3 player, and the like, have been considered. One of the techniques for the wireless power transmission may use a resonance characteristic of a radio frequency (RF) device.

SUMMARY

In one general aspect, there is provided a battery pack comprising a thin film type resonator for wireless power transmission, and a battery to charge a power source using power generated by the thin film type resonator.

The thin film type resonator may comprise a first transmission line unit provided in a thin film type, a second transmission line unit provided in a thin film type, and a capacitor inserted into a predetermined position of the first transmission line unit.

The first transmission line unit may be disposed in an upper portion of the battery, and the second transmission line unit may be disposed in a lower portion of the battery.

The thin film type resonator may comprise a ferromagnetic body.

A high impedance surface may be provided between the thin film type resonator and the battery.

The thin film type resonator may comprise a first transmission line unit provided in a thin film type, a capacitor inserted into a predetermined position of the first transmission line unit, and a micro strip line to supply a current to the first transmission line unit.

The thin film type resonator may further comprise a bonding layer to bond to the battery.

The capacitor may be configured such that the thin film type resonator has a property of a metamaterial.

The capacitor may be configured such that the thin film type resonator has a negative magnetic permeability at a target frequency.

In another aspect, there is provided a battery pack comprising a resonator for wireless power transmission, a battery to charge a power source using a power generated by the resonator, and a blocking portion to block a surface current induced by a magnetic field formed between the resonator and the battery.

The resonator may be provided in a three-dimensional (3D) type in which a plurality of thin film resonators are arranged in parallel.

The blocking portion may be configured to have a high impedance surface.

In another aspect, there is provided a wirelessly chargeable battery pack, comprising a thin film type resonator configured to generate power wirelessly, and a battery configured to charge a power source using power generated by the thin film type resonator.

The thin film type resonator may comprise a first transmission line unit that functions as a first thin film type resonator and a second transmission line unit that functions as a second thin film type resonator.

The wirelessly chargeable battery pack may include a stacked structure such that the first transmission line unit is disposed on a top surface of the battery and the second transmission line unit is disposed on a bottom surface of the battery that is opposite to the top surface of the battery.

The wirelessly chargeable battery pack may include a stacked structure such that the first transmission line unit is stacked on a top surface of the battery, a dielectric layer is stacked on a top surface of the first transmission line, and the second transmission line is stacked on a top surface of the dielectric layer.

A high impedance surface may be disposed between the first transmission line unit and the battery and the high impedance surface may be disposed between the battery and the second transmission line unit.

The thin film type resonator may comprise a capacitor and a transmission line, and the capacitor may be inserted in series into an intermediate portion of the transmission line unit and an electric field may be confined within the capacitor.

The thin film type resonator may further comprises a feeding unit configured in the shape of a micro-strip line that supplies current to the transmission line unit.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, description of well-known functions and constructions may be omitted for increased clarity and conciseness.

As described herein, for example, the source or transmitter may be, or may be included in, a terminal, such as a mobile terminal, a personal computer, a personal digital assistant (PDA), an MP3 player, and the like. As another example, the target or receiver described herein may be, or may be included in, a terminal, such as a mobile terminal, a personal computer, a personal digital assistant (PDA), an MP3 player, and the like. As another example, the transmitter and/or the receiver may be a separate individual unit.

Figure 1:
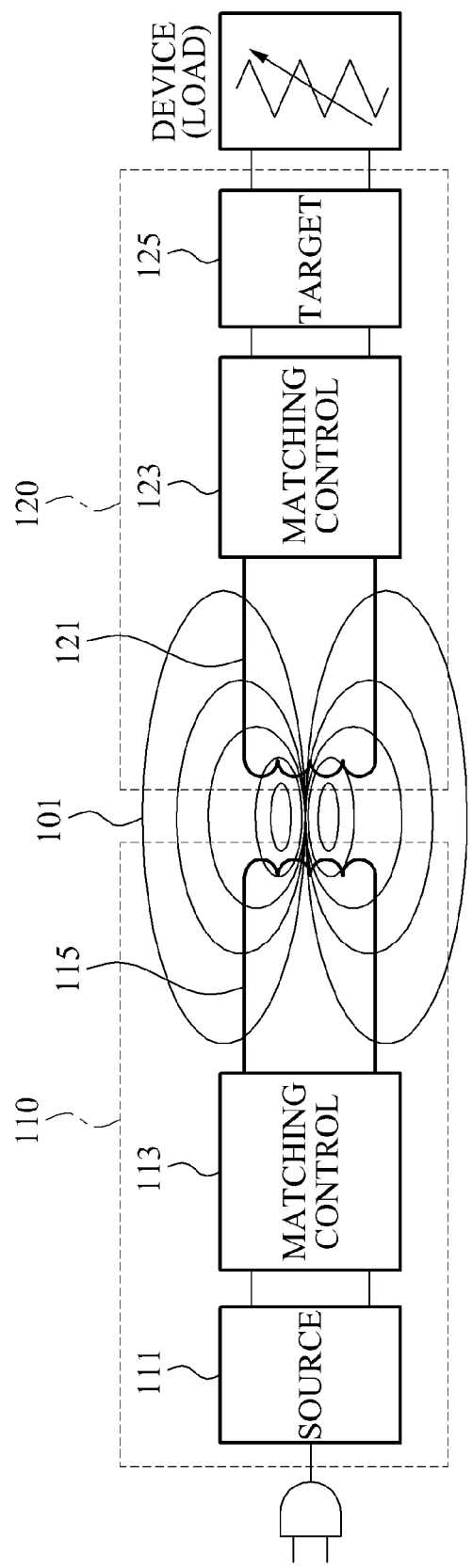
FIG. 1 is a diagram illustrating an example of a wireless power transmission system.

FIG. 1 illustrates an example of a wireless power transmission system.

As described herein, a wireless power transmitted using the wireless power transmission system may be referred to as resonance power.

Referring to FIG. 1, the wireless power transmission system has a source-target structure that includes a source and a target. In this example, the wireless power transmission system includes a resonance power transmitter 110 that corresponds to the source and a resonance power receiver 120 that corresponds to the target.

The resonance power transmitter 110 includes a source unit 111 and a source resonator 115. The source unit 111 may receive energy from an external voltage supplier to generate a resonance power. The resonance power transmitter 110 may further include a matching control 113 to perform resonance frequency and/or impedance matching.

For example, the source unit 111 may include an alternating current (AC)-to-AC (AC/AC) converter, an AC-to-direct current (DC) (AC/DC) converter, a DC-to-AC (DC/AC) inverter, and the like. The AC/AC converter may adjust, to a desired level, a signal level of an AC signal input from an external device. The AC/DC converter may output a DC voltage at a predetermined level by rectifying an AC signal output from the AC/AC converter. The DC/AC inverter may generate an AC signal of hertz (Hz), for example, a few megahertz (MHz) to tens of MHz band by quickly switching a DC voltage output from the AC/DC converter.

The matching control 113 may set at least one of a resonance bandwidth of the source resonator 115 and an impedance matching frequency of the source resonator 115. Although not illustrated in FIG. 1, the matching control 113 may include a source resonance bandwidth setting unit and/or a source matching frequency setting unit. For example, the source resonance bandwidth setting unit may set the resonance bandwidth of the source resonator 115. As another example, the source matching frequency setting unit may set the impedance matching frequency of the source resonator 115. For example, a Q-factor of the source resonator 115 may be determined based on the setting of the resonance bandwidth of the source resonator 115 and/or the setting of the impedance matching frequency of the source resonator 115.

The source resonator 115 may transfer electromagnetic energy to a target resonator 121. For example, the source resonator 115 may transfer the resonance power to the resonance power receiver 120 through magnetic coupling 101 with a target resonator 121. For example, the source resonator 115 may resonate within the set resonance bandwidth.

In this example, the resonance power receiver 120 includes the target resonator 121, a matching control 123 to perform resonance frequency and/or impedance matching, and a target unit 125 to transfer the received resonance power to a load.

The target resonator 121 may receive the electromagnetic energy from the source resonator 115. For example, the target resonator 121 may resonate within the set resonance bandwidth.

The matching control 123 may set at least one of a resonance bandwidth of the target resonator 121 and an impedance matching frequency of the target resonator 121. Although not illustrated in FIG. 1, the matching control 123 may include a target resonance bandwidth setting unit and/or a target matching frequency setting unit. For example, the target resonance bandwidth setting unit may set the resonance bandwidth of the target resonator 121. As another example, the target matching frequency setting unit may set the impedance matching frequency of the target resonator 121. For example, a Q-factor of the target resonator 121 may be determined based on the setting of the resonance bandwidth of the target resonator 121 and/or the setting of the impedance matching frequency of the target resonator 121.

The target unit 125 may transfer the received resonance power to a load. The target unit 125 may include an AC/DC converter and/or a DC/DC converter. For example, the AC/DC converter may generate a DC voltage by rectifying an AC signal transmitted from the source resonator 115 to the target resonator 121. For example, the DC/DC converter may supply a rated voltage to a device or the load by adjusting a voltage level of the DC voltage.

As an example, the source resonator 115 and the target resonator 121 may be configured in a helix coil structured resonator, a spiral coil structured resonator, a meta-structured resonator, and the like.

Referring to FIG. 1, a process for controlling the Q-factor may include setting the resonance bandwidth of the source resonator 115 and the resonance bandwidth of the target resonator 121, and transferring the electromagnetic energy from the source resonator 115 to the target resonator 121 through magnetic coupling 101 between the source resonator 115 and the target resonator 121. For example, the resonance bandwidth of the source resonator 115 may be set wider or narrower than the resonance bandwidth of the target resonator 121. For example, an unbalanced relationship between a bandwidth (BW)-factor of the source resonator 115 and a BW-factor of the target resonator 121 may be maintained by setting the resonance bandwidth of the source resonator 115 to be wider or narrower than the resonance bandwidth of the target resonator 121.

In a wireless power transmission system employing a resonance scheme, the resonance bandwidth may be an important factor. For example, when the Q-factor considering a change in a distance between the source resonator 115 and the target resonator 121, a change in the resonance impedance, impedance mismatching, a reflected signal, and the like, is Qt, Qt may have an inverse-proportional relationship with the resonance bandwidth, as given by Equation 1.

$$\frac{\Delta f}{f_0} = \frac{1}{Qt}$$

$$= \Gamma_{S,D} + \frac{1}{BW_S} + \frac{1}{BW_D}$$

[Equation 1]

In Equation 1, $f_0$ denotes a central frequency, $\Delta f$ denotes a change in a bandwidth, $\Gamma_{S,D}$ denotes a reflection loss between the source resonator 115 and the target resonator 121, $BW_S$ denotes the resonance bandwidth of the source resonator 115, and $BW_D$ denotes the resonance bandwidth of the target resonator 121. As described herein, the BW-factor may indicate either $1/BW_S$ or $1/BW_D$.

Due to an external effect, impedance mismatching between the source resonator 115 and the target resonator 121 may occur. For example, a change in the distance between the source resonator 115 and the target resonator 121, a change in a location of at least one of the source resonator 115 and the target resonator 121, and the like, may cause impedance mismatching between the source resonator 115 and the target resonator 121 to occur. The impedance mismatching may be a direct cause in decreasing the efficiency of power transfer. For example, when a reflected wave corresponding to a transmission signal that is partially reflected by a target and returned towards the source is detected, the matching control 113 may determine the impedance mismatching has occurred, and may perform impedance matching. For example, the matching control 113 may change a resonance frequency by detecting a resonance point through a waveform analysis of the reflected wave. As an example, the matching control 113 may determine, as the resonance frequency, a frequency having a minimum amplitude in the waveform of the reflected wave.

Figure 2:
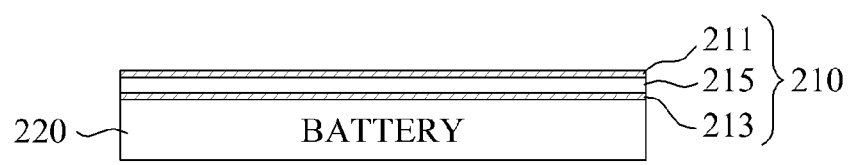
FIG. 2 is a diagram illustrating an example of a battery pack.

FIG. 2 illustrates an example of a battery pack.

Referring to FIG. 2, the battery pack includes a thin film type resonator 210 for a wireless power transmission and a battery 220 to charge a power source using power generated by the thin film type resonator 210.

For example, the thin film type resonator 210 may be configured to have a stacked structure. The thin film type resonator 210 may include a first transmission line unit 211 provided in a thin film type and a second transmission line unit 213 provided in the thin film type. In this example, the thin film type resonator 210 includes a dielectric layer 215 between the first transmission line unit 211 and the second transmission line unit 213. The dielectric layer 215 may be configured to increase a magnetic field of the thin film type resonator 210. For example, the dielectric layer 215 may be configured as a ferromagnetic body. The ferromagnetic body may have an effect of increasing the wireless power transmission.

Figure 3:
FIG. 3 and FIG. 4 are diagrams illustrating examples of a battery pack.
Figure 4:

FIG. 3 and FIG. 4 illustrate examples of a battery pack.

Referring to FIG. 3, the battery pack includes a first transmission line unit 211 and a battery 220. The first transmission line unit 211 may function as a thin film type resonator. The first transmission line unit 211 of FIG. 3 may be referred to as a single layer resonator of a thin film type to distinguish the first transmission line unit 211 from a stacked structure of FIG. 2. A conductor loss may decrease in the stacked structure of FIG. 2 in comparison to the single layer resonator of the thin film type. Accordingly, a second transmission line unit 213 may be stacked on the first transmission line unit 211 such that a strong coupling is maintained, and conducting loss is prevented.

Referring to FIG. 4, the battery pack includes a first transmission line unit 211 disposed on an upper side of a battery 220, a second transmission line unit 213 disposed on a lower side of the battery 220, and the battery 220. In the example of FIG. 4, the first transmission line unit 211 and the second transmission line unit 213 may function as a thin film type resonator of a stacked structure. In the example of FIG. 4, the second transmission line unit 213 may be incorporated into a body of a portable terminal instead of in the battery pack, and may be configured in the same structure as that of FIG. 4.

Figure 5:
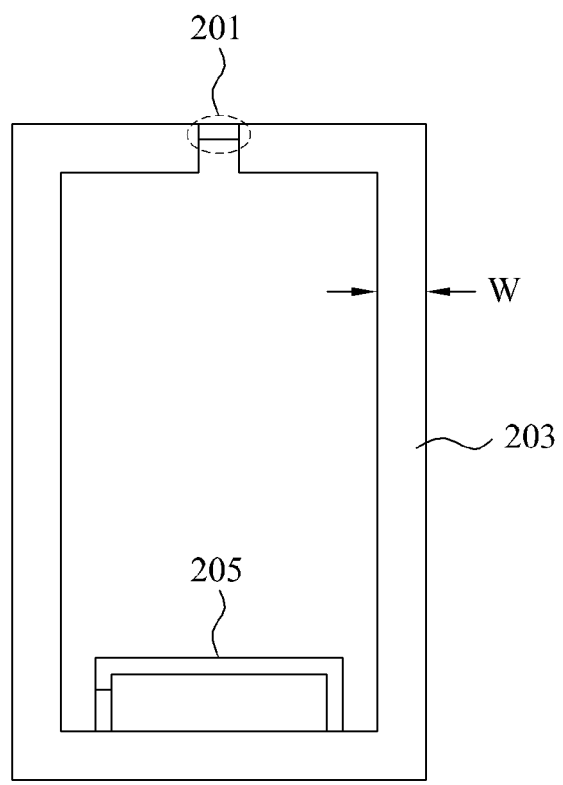
FIG. 5 is a diagram illustrating an example of a first transmission line unit.
Figure 7:
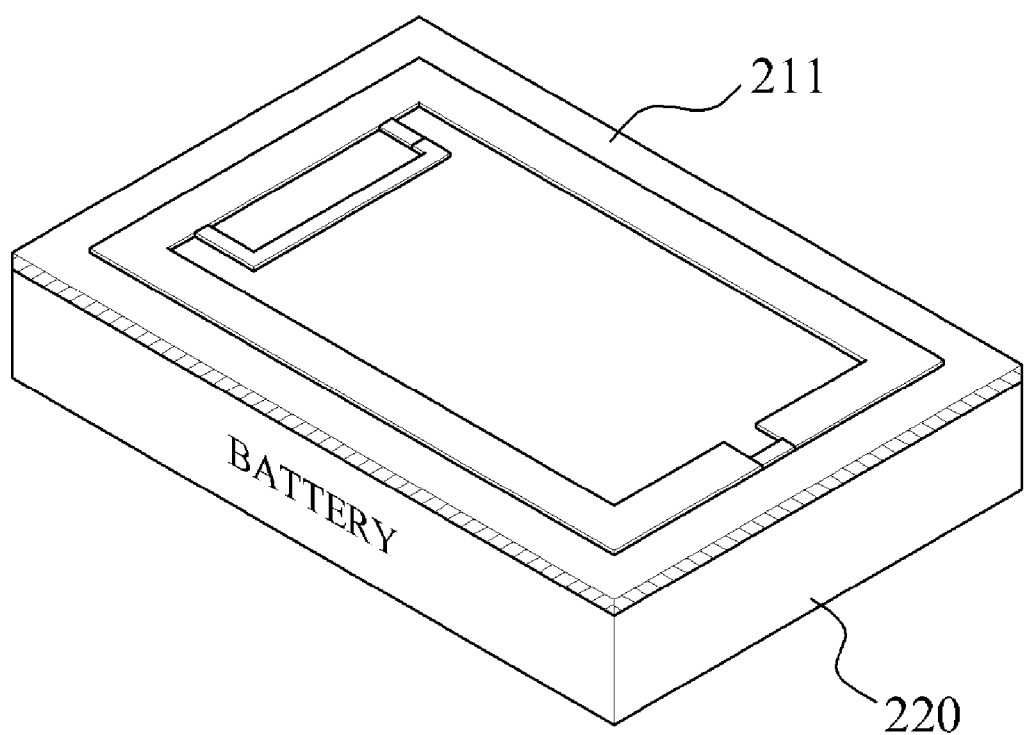
FIG. 7 is a diagram illustrating an example of a battery pack including the first transmission line unit of FIG. 5.

FIG. 5 illustrates an example of a first transmission line unit. FIG. 7 illustrates an example of a battery pack including the first transmission line unit of FIG. 5.

As an example, the first transmission line unit 211 illustrated in FIG. 5 may be the single layer resonator of the thin film type illustrated in FIG. 3, and may be applied to the stacked structure of FIG. 2.

For example, the first transmission line unit 211 may include a transmission line 203 and a capacitor 201. The first transmission line unit 211 may further include a feeding unit 205. For example, a second transmission line unit 213 may have the same structure as that of the first transmission line unit 211. As another example, the second transmission line unit 213 may have a structure free of the feeding unit 205 and the capacitor 201.

The capacitor 201 may be inserted into a predetermined portion of the first transmission line unit 211. For example, the capacitor 201 may be inserted in series into an intermediate portion of the first transmission line unit 211. An electric field may be confined within the capacitor 201.

The capacitor 201 may be inserted into the first transmission line unit 211 in a shape of a lumped element and a distributed element. For example, the capacitor may be in a shape of an interdigital capacitor or a gap capacitor with a substrate having a relatively high to permittivity in the middle. When the capacitor 201 is inserted into the first transmission line unit 211, the resonator may have a property of a metamaterial.

A metamaterial indicates a material that has a predetermined electrical property that has not been found in nature, and thus, may have an artificially designed structure. An electromagnetic characteristic of the materials existing in nature may have a unique magnetic permeability or a unique permittivity. Most materials may have a positive magnetic permeability or a positive permittivity. In the case of most materials, a right hand rule may be applied to an electric field, a magnetic field, and a pointing vector, and thus, the corresponding materials may be referred to as right handed materials (RHMs). However, a metamaterial has a magnetic permeability or a permittivity less than "1" and thus, may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

When a capacitance of the capacitor 201 inserted as the lumped element is determined, the resonator may have the characteristic of the metamaterial. Because the resonator may have a negative magnetic permeability by adjusting the capacitance of the capacitor 201, the resonator may be referred to as an MNG resonator provided in a thin film type.

The MNG resonator of the thin film type may have a zeroth order resonance characteristic of having, as a resonance frequency, a frequency when a propagation constant is "0". For example, a zeroth order resonance characteristic may be a frequency transmitted through a line or a medium that has a propagation constant of "0." Because the MNG resonator of the thin film type may have the zeroth order resonance characteristic, the resonance frequency may be independent with respect to a physical size of the MNG resonator of the thin film type. By appropriately designing the capacitor 201, the MNG resonator of the thin film type may sufficiently change the resonance frequency. Accordingly, the physical size of the MNG resonator of the thin film type may not be changed.

In a near field, the electric field may be concentrated on the series capacitor 201 inserted into the first transmission line unit 211. Accordingly, because of the series capacitor 201, the magnetic field may become dominant in the near field.

The MNG resonator of the thin film type may have a relatively high Q-factor using the capacitor 201 of the lumped element, and thus, it is possible to enhance the efficiency of power transmission.

For example, the feeding unit 205 may be configured in the shape of a micro-strip line that supplies a current to the first transmission line unit 211. Accordingly, the thin film resonator may have a structure in which a matcher for impedance matching is not needed.

Figure 6:
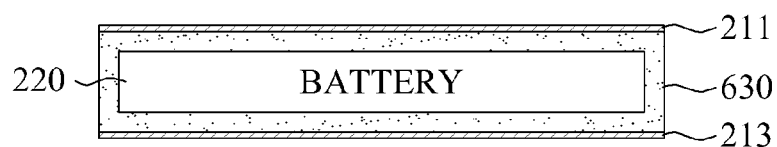
FIG. 6 is a diagram illustrating another example of a battery pack.

FIG. 6 illustrates another example of a battery pack.

Referring to FIG. 6, the battery pack includes a high impedance surface (HIS) 630 disposed between thin film type resonators 211 and 213 and a battery 220. In this example, the HIS 630 may block a surface current induced by a magnetic field formed between the thin film type resonators 211 and 213 and the battery 220, and may remove interference, and may prevent a characteristic of the resonator from being changed. For example, the HIS 630 may be configured in a thin film type to be bonded to the battery 220.

Although not illustrated in FIG. 2 though FIG. 6, the thin film type resonator 210, the first transmission line unit 211, and the second transmission line unit 213 may further include a bonding layer to be bonded to the battery 220.

Figure 8:
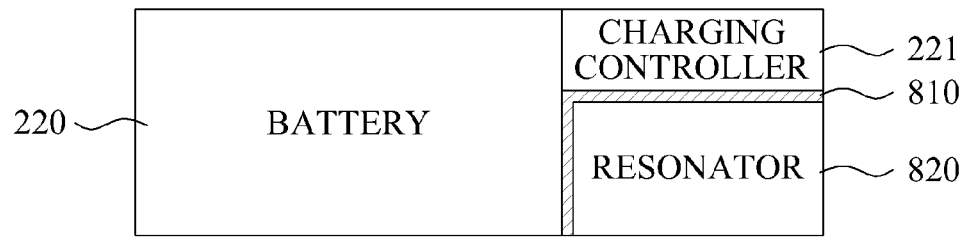
FIG. 8 and FIG. 9 are diagrams illustrating still additional examples of a battery pack.
Figure 9:
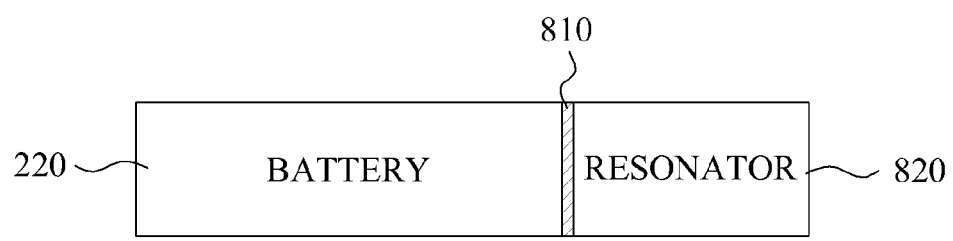

FIG. 8 and FIG. 9 illustrate additional examples of a battery pack. FIG. 8 is a first side view of the battery pack, and FIG. 9 is a second side view of the battery pack. In this example, the battery pack and the resonator have a three-dimensional (3D) structure.

Referring to FIG. 8 and FIG. 9, the battery pack may include a resonator 820, a charging controller 221, a battery 220, and a blocking portion 810.

In this example, the resonator 820 that has a three-dimensional (3D) structure may be configured by disposing a plurality of thin film type resonators in parallel. When the plurality of thin film type resonators are disposed in parallel, a transmission efficiency and transmission distance of the resonator 820 that has the 3D structure may increase.

As an example, the charging controller 221 may be a charging circuit employed in a general battery pack.

The blocking portion 810 may be configured by the HIS or a shielding material. Accordingly, the blocking portion 810 may have a characteristic of the HIS. The blocking portion 810 may block a surface current induced by a magnetic field formed between the resonator 820 and the battery 220, and may remove interference.

Figure 10:
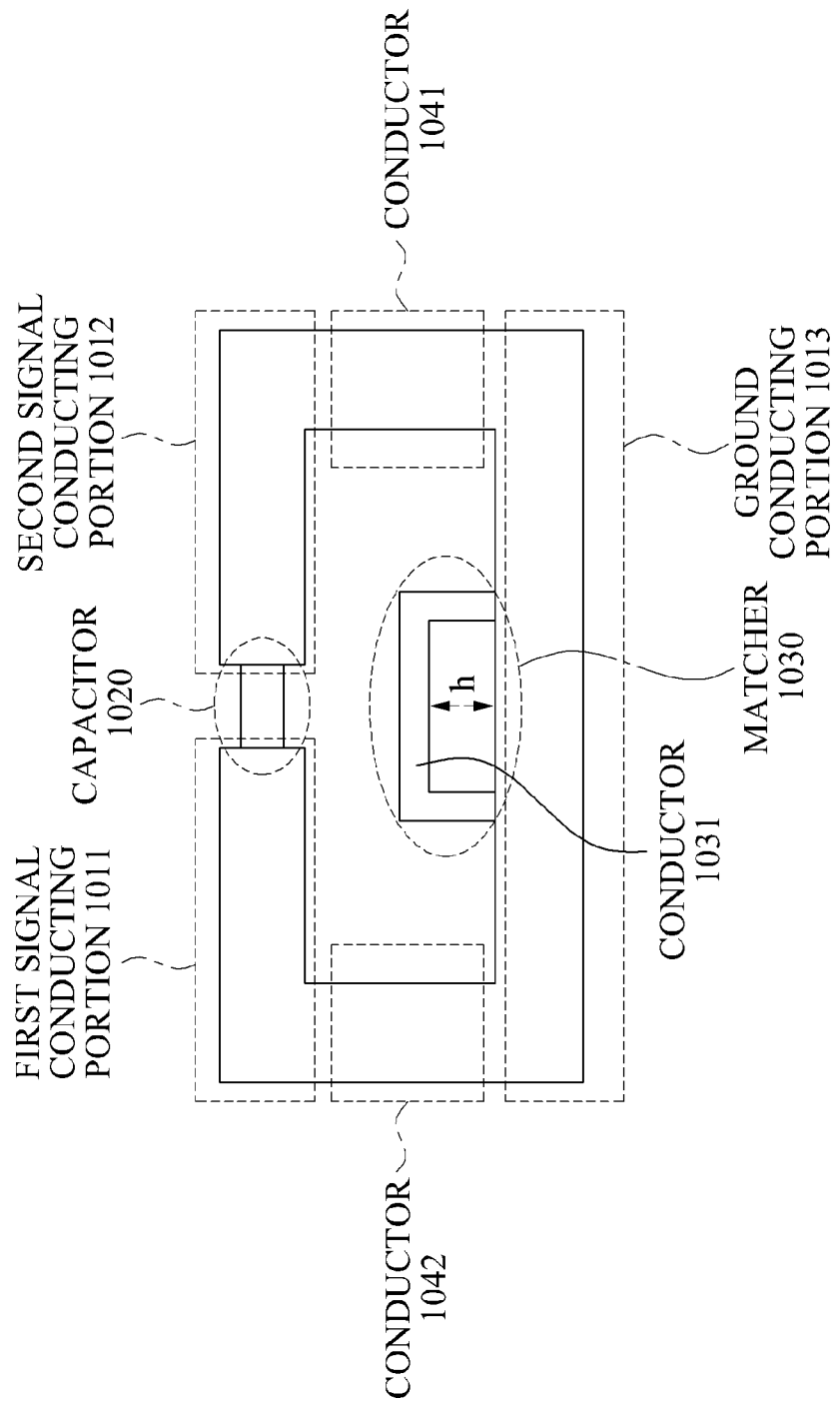
FIG. 10 is an example of the first transmission line unit of FIG. 5.

FIG. 10 illustrates an example of the first transmission line unit of FIG. 5.

Referring to FIG. 10, the first transmission line unit 1000 includes a transmission line, a capacitor 1020, a matcher 1030, and conductors 1041 and 1042. For example, the transmission line may include a first signal conducting portion 1011, a second signal conducting portion 1012, and a ground conducting portion 1013.

The capacitor 1020 may be inserted in series between the first signal conducting portion 1011 and the second signal conducting portion 1012, and an electric field may be confined within the capacitor 1020. Generally, the transmission line may include at least one conductor in an upper portion of the transmission line, and may also include at least one conductor in a lower portion of the transmission line. Current may flow through the at least one conductor disposed in the upper portion of the transmission line and the at least one conductor disposed in the lower portion of the transmission line may be electrically grounded. Herein, a conductor disposed in an upper portion of the transmission line may be separated into multiple portions. In this example, the upper portion is separated into two conducting portions referred to as the first signal conducting portion 1011 and the second signal to conducting portion 1012. A conductor disposed in the lower portion of the transmission line may be referred to as the ground conducting portion 1013.

As shown in FIG. 10, the first transmission line unit 1000 may have the 2D structure. For example, the transmission line may include the first signal conducting portion 1011 and the second signal conducting portion 1012 in the upper portion of the transmission line, and may include the ground conducting portion 1013 in the lower portion of the transmission line. The first signal conducting portion 1011 and the second signal conducting portion 1012 may be disposed to face the ground conducting portion 1013. Current may flow through the first signal conducting portion 1011 and the second signal conducting portion 1012.

One end of the first signal conducting portion 1011 may be shorted to the conductor 1042, and another end of the first signal conducting portion 1011 may be connected to the capacitor 1020. One end of the second signal conducting portion 1012 may be grounded to the conductor 1041, and another end of the second signal conducting portion 1012 may be connected to the capacitor 1020. Accordingly, the first signal conducting portion 1011, the second signal conducting portion 1012, the ground conducting portion 1013, and the conductors 1041 and 1042 may be connected to each other, such that the first transmission line unit 1000 is an electrically closed-loop structure. The term "loop structure" may include a polygonal structure, for example, a circular structure, a rectangular structure, and the like. "Having a loop structure" may indicate a circuit that is electrically closed.

The capacitor 1020 may be inserted into an intermediate portion of the transmission line. For example, the capacitor 1020 may be inserted into a space between the first signal conducting portion 1011 and the second signal conducting portion 1012. The capacitor 1020 may have a shape of a lumped element, a distributed element, and the like. For example, a distributed capacitor having the shape of the distributed element may include zigzagged conductor lines and a dielectric material having a relatively high permittivity between the zigzagged conductor lines.

When the capacitor 1020 is inserted into the transmission line, the first transmission line unit 1000 may have a property of a metamaterial. As described herein, a metamaterial indicates a material that has a predetermined electrical property that has not been found in nature, and thus, may have an artificially designed structure.

When a capacitance of the capacitor inserted as the lumped element is determined, the first transmission line unit 1000 may have the characteristic of the metamaterial. Because the first transmission line unit 1000 may have a negative magnetic permeability by adjusting the capacitance of the capacitor 1020, the first transmission line unit 1000 may also be referred to as an MNG resonator. Various criteria may be applied to determine the capacitance of the capacitor 1020. For example, the various criteria may include a criterion for enabling the first transmission line unit 1000 to have the characteristic of the metamaterial, a criterion for enabling the first transmission line unit 1000 to have a negative magnetic permeability in a target frequency, a criterion for enabling the first transmission line unit 1000 to have a zeroth order resonance characteristic in the target frequency, and the like. For example, the capacitance of the capacitor 1020 may be determined by at least one criterion.

The first transmission line unit 1000, also referred to as the MNG first transmission line unit 1000, may have a zeroth order resonance characteristic of having, as a resonance frequency, a frequency when a propagation constant is "0".

Because the first transmission line unit 1000 may have the zeroth order resonance characteristic, the resonance frequency may be independent with respect to a physical size of the MNG first transmission line unit 1000. By appropriately designing the capacitor 1020, the MNG first transmission line unit 1000 may sufficiently change the resonance frequency. Accordingly, the physical size of the MNG first transmission line unit 1000 may not be changed.

In a near field, the electric field may be concentrated on the capacitor 1020 inserted into the transmission line. Accordingly, due to the capacitor 1020, the magnetic field may become dominant in the near field. The MNG first transmission line unit 1000 may have a relatively high Q-factor using the capacitor 1020 of the lumped element, and thus, it is possible to enhance an efficiency of power transmission. In this example, the Q-factor indicates a level of an ohmic loss or a ratio of a reactance with respect to a resistance in the wireless power transmission. The efficiency of wireless power transmission may increase based on an increase in the Q-factor.

The MNG first transmission line unit 1000 may include the matcher 1030 for impedance matching. The matcher 1030 may adjust a strength of a magnetic field of the MNG first transmission line unit 1000. An impedance of the MNG first transmission line unit 1000 may be determined by the matcher 1030. Current may flow into and/or out of the MNG first transmission line unit 1000 via a connector. For example, the connector may be connected to the ground conducting portion 1013 or the matcher 1030. As an example, power may be transferred through coupling between the connector and the ground conducting portion 1013 or the matcher 1030 without using a physical connection.

For example, as shown in FIG. 10, the matcher 1030 may be positioned within the loop formed by the loop structure of the first transmission line unit 1000. The matcher 1030 may adjust the impedance of the first transmission line unit 1000 by changing the physical shape of the matcher 1030. For example, the matcher 1030 may include the conductor 1031 for the impedance matching in a location that is separated from the ground conducting portion 1013 by a distance h. The impedance of the first transmission line unit 1000 may be changed by adjusting the distance h.

Although not illustrated in FIG. 10, a controller may be provided to control the matcher 1030. For example, the matcher 1030 may change the physical shape of the matcher 1030 based on a control signal generated by the controller. For example, the distance h between the conductor 1031 of the matcher 1030 and the ground conducting portion 1013 may increase or decrease based on the control signal. Accordingly, the physical shape of the matcher 1030 may be changed and the impedance of the resonator 1000 may be adjusted. The controller may generate the control signal based on various factors, which are further described herein.

As shown in FIG. 10, the matcher 1030 may be configured as a passive element such as the conductor 1031. For example, the matcher 1030 may be configured as an active element such as a diode, a transistor, and the like. When the active element is included in the matcher 1030, the active element may be driven based on the control signal generated by the controller, and the impedance of the resonator 1000 may be adjusted based on the control signal. For example, a diode that is a type of the active element may be included in the matcher 1030. The impedance of the resonator 1000 may be adjusted based on whether the diode is in an ON state or in an OFF state.

According to various examples, provided is a thin film type MNG resonator having the resonance frequency independent with respect to a physical size of the resonator.

According to various examples, provided is a battery pack integrally employing a thin film type MNG resonator.

According to various examples, provided is a battery pack that may be wirelessly chargeable when the battery pack is separated from a portable device, and may have no change in a characteristic of a resonator.

The methods, processes, functions, and software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), to flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable labtop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A battery pack comprising:
a thin film type resonator for wireless power transmission; and
a battery to charge a power source using power generated by the thin film type resonator, wherein
the thin film type resonator comprises a first transmission line unit which is provided in a thin film type,
wherein the first transmission line unit comprises a matcher configured to adjust impedance of the first transmission line unit by changing physical shape of the matcher.

2. The battery pack of claim 1, wherein the thin film type resonator comprises:
a second transmission line unit provided in a thin film type; and
a capacitor inserted into a predetermined position of the first transmission line unit.

3. The battery pack of claim 2, wherein the second transmission line unit is disposed in a lower portion of the battery.

4. The battery pack of claim 1, wherein the thin film type resonator comprises a ferromagnetic body.

5. The battery pack of claim 1, wherein a high impedance surface is provided between the thin film type resonator and the battery.

6. The battery pack of claim 1, wherein the thin film type resonator comprises:
a capacitor inserted into a predetermined position of the first transmission line unit; and
a micro strip line to supply a current to the first transmission line unit.

7. The battery pack of claim 6, wherein the thin film type resonator further comprises a bonding layer to bond to the battery.

8. The battery pack of claim 6, wherein the capacitor is configured such that the thin film type resonator has a property of a metamaterial.

9. The battery pack of claim 6, wherein the capacitor is configured such that the thin film type resonator has a negative magnetic permeability at a target frequency.

10. A battery pack comprising:
a resonator for wireless power transmission;
a battery to charge a power source using a power generated by the resonator; and
a blocking portion to block a surface current induced by a magnetic field formed between the resonator and the battery,
wherein the resonator comprises a transmission line unit which is provided in a thin film type,
wherein the transmission line unit comprises a matcher configured to adjust impedance of the transmission fine unit by changing physical shape of the matcher.

11. The battery pack of claim 10, wherein the resonator is provided in a three-dimensional (3D) type in which a plurality of thin film resonators are arranged in parallel.

12. The battery pack of claim 10, wherein the blocking portion is configured to have a high impedance surface.

13. A wirelessly chargeable battery pack, comprising:
a thin film type resonator configured to generate power wirelessly; and
a battery configured to charge a power source using power generated by the thin film type resonator, wherein
the thin film type resonator comprises a first transmission line unit which is provided in a thin film type,
wherein the first transmission line unit comprises a matcher configured to adjust impedance of the first transmission line unit by changing physical shape of the matcher.

14. The wirelessly chargeable battery pack of claim 13, wherein the thin film type resonator comprises a second transmission line unit that functions as a second thin film type resonator; and the first transmission line unit functions as a first thin film type resonator.

15. The wirelessly chargeable battery pack of claim 14, wherein the wirelessly chargeable battery pack includes a stacked structure such that the first transmission line unit is disposed on a top surface of the battery and the second transmission line unit is disposed on a bottom surface of the battery that is opposite to the top surface of the battery.

16. The wirelessly chargeable battery pack of claim 14, wherein the wirelessly chargeable battery pack includes a stacked structure such that the first transmission line unit is stacked on a top surface of the battery, a dielectric layer is stacked on a top surface of the first transmission line, and the second transmission line is stacked on a top surface of the dielectric layer.

17. The wirelessly chargeable battery pack of claim 15, wherein a high impedance surface is disposed between the first transmission line unit and the battery and the high impedance surface is disposed between the battery and the second transmission line unit.

18. The wirelessly chargeable battery pack of claim 13, wherein the thin film type resonator comprises a capacitor, and the capacitor is inserted in series into an intermediate portion of the first transmission line unit and an electric field is confined within the capacitor.

19. The wirelessly chargeable battery pack of claim 18, wherein the thin film type resonator further comprises a feeding unit configured in the shape of a micro-strip line that supplies current to the transmission line unit.

20. The battery pack of claim 1, further comprising a matching control configured to set one or a combination of a resonance bandwidth and an impedance matching frequency of the thin film type resonator.

* * * * *